(12) United States Patent
Dighe et al.

(10) Patent No.: US 8,606,940 B2
(45) Date of Patent: Dec. 10, 2013

(54) DHCP ADDRESS CONFLICT DETECTION/ENFORCEMENT

(75) Inventors: Sahil Dighe, Salt Lake City, UT (US); Joseph Olakangil, Midvale, UT (US)

(73) Assignee: Alcatel Lucent, Paris (FR)

( * ) Notice: Subject to any disclaimer, the term of this patent is extended or adjusted under 35 U.S.C. 154(b) by 549 days.

(21) Appl. No.: 12/012,878

(22) Filed: Feb. 6, 2008

(65) Prior Publication Data

US 2009/0198800 A1     Aug. 6, 2009

(51) Int. Cl.
  *G06F 15/16* (2006.01)
(52) U.S. Cl.
  USPC ............................ 709/229; 709/227; 709/228
(58) Field of Classification Search
  USPC ......... 709/223, 226, 227, 228, 235, 245, 220, 709/221, 212, 213, 214, 215, 216
  See application file for complete search history.

(56) References Cited

U.S. PATENT DOCUMENTS

| | | | | |
|---|---|---|---|---|
| 6,424,659 B2 * | 7/2002 | Viswanadham et al. | ...... | 370/469 |
| 6,480,508 B1 * | 11/2002 | Mwikalo et al. | ............. | 370/475 |
| 6,957,276 B1 * | 10/2005 | Bahl | .............................. | 709/245 |
| 7,002,943 B2 * | 2/2006 | Bhagwat et al. | ............. | 370/338 |
| 7,167,922 B2 * | 1/2007 | Narayanan | ................... | 709/242 |
| 7,200,649 B1 * | 4/2007 | Batke et al. | .................... | 709/222 |
| 7,596,614 B2 * | 9/2009 | Saunderson et al. | .......... | 709/224 |
| 7,610,487 B2 * | 10/2009 | Aura et al. | ..................... | 713/168 |
| 7,693,158 B1 * | 4/2010 | Carrie | ....................... | 370/395.53 |
| 7,710,933 B1 * | 5/2010 | Sundaralingam et al. | .... | 370/338 |
| 7,804,808 B2 * | 9/2010 | Bhagwat et al. | .............. | 370/338 |
| 7,870,603 B2 * | 1/2011 | Foschiano et al. | .............. | 726/13 |
| 2004/0255154 A1 * | 12/2004 | Kwan et al. | .................... | 713/201 |
| 2005/0160335 A1 * | 7/2005 | Peterson | ....................... | 714/724 |
| 2006/0092859 A1 * | 5/2006 | Choi et al. | ..................... | 370/254 |
| 2006/0095968 A1 * | 5/2006 | Portolani et al. | ................ | 726/23 |
| 2006/0153192 A1 * | 7/2006 | Pohlabel et al. | .............. | 370/392 |
| 2006/0174342 A1 * | 8/2006 | Zaheer et al. | .................... | 726/23 |
| 2006/0206611 A1 * | 9/2006 | Nakamura | .................... | 709/226 |
| 2006/0248229 A1 * | 11/2006 | Saunderson et al. | .......... | 709/245 |
| 2007/0140275 A1 * | 6/2007 | Bowman et al. | .............. | 370/401 |

FOREIGN PATENT DOCUMENTS

WO    WO 2007077234 A1 *   7/2007

* cited by examiner

*Primary Examiner* — Dhairya A Patel
(74) *Attorney, Agent, or Firm* — Hitt Gaines, PC

(57) ABSTRACT

The present invention resolves IP address conflicts in a network with DHCP or other address assignment protocol when some host on the network uses a conflicting static IP address to an IP address assigned to another host. The preferred method involves offering a given IP address to a host/node through the address assignment protocol while also detecting any other host/node using the offered IP address on a given VLAN using address resolution protocol. If another host/node is using the IP address, the offending host/node may be blocked on that VLAN for a set amount of time.

6 Claims, 2 Drawing Sheets

DHCP ADDRESS CONFLICT DETECTION/ENFORCEMENT

CROSS REFERENCE TO RELATED APPLICATIONS

This United States non-provisional patent application does not claim priority to any United States provisional patent application or any foreign patent application.

FIELD OF THE DISCLOSURE

The disclosures made herein relate generally to IP address conflict resolution. More specifically, the invention described herein resolves IP address conflicts in a network utilizing DHCP or any other address assignment protocol when some host on the network uses a conflicting static IP address to an IP address assigned to another host.

BACKGROUND

The internet is actually a group of interconnected networks. Messages between computers are exchanged over the internet by using packet switching. Different networks use a protocol to allow them to communicate with one another.

Internet Protocol (IP) specifies the format of IP packet headers as they travel through the network. Routers utilize routing tables to send data packets through the network from node to node. Every computer on the internet has a unique address. IP attaches to the data packet the address from which the data comes and the address of the system to which it is going in a protocol header.

A Local Area Network (LAN) connects terminals over a small geographic area. A Virtual Local Area Network (VLAN) is a network of computers that behave as if they are connected in close geographic proximity to one another even though they may actually be physically located on different segments of a LAN. VLANs are configured through software rather than hardware.

Dynamic Host Configuration Protocol (DHCP) allows devices operating within a network to obtain various parameters necessary to operate in an IP network. DHCP permits devices to be added to the network often without requiring any manual steps. DHCP provides a way to administer network parameter assignment at a single DHCP server.

The DHCP server manages a pool of IP addresses. A DHCP server usually provides a lease on an IP address for a set period of time. A host can request renewal of the lease on the current IP address while the lease is active. To avoid losing their leases while connected to a network, most hosts will renew the lease to maintain the same IP address throughout their connection to a single network. A host that loses an IP address due to an expired lease will need to obtain a new IP address from the DHCP server before network connectivity is restored.

The DHCP server ensures that all IP addresses are unique to prevent assignment of a given IP address to a second host while the first host's lease continues. The DHCP server is designed to manage the pool of IP addresses rather than relying on a network administrator.

Hosts send an IP lease request to a DHCP server. The DHCP server then extends an IP lease offer. The DHCP server reserves an IP address for the host and sends an offer across the network to the host.

When the host receives an IP lease offer from a DHCP server, it informs all the other DHCP servers that it has accepted an offer. The host broadcasts a request message containing the IP address of the DHCP server that made the offer.

When the other DHCP servers receive the request message, they withdraw any offers that they might have made to the host. Any IP addresses they had reserved for that host are returned to the pool of valid addresses that the DHCP servers may offer to other hosts. After the DHCP server receives the request message from the host, an acknowledgement packet is sent from the DHCP server to the host to acknowledge receipt of the request message.

Address Resolution Protocol (ARP) may be used when two hosts are on different networks and must communicate through a router. In cases in which the two hosts are on separate networks, the sending host sends its packet to a router which looks up the receiving host's IP address or the IP address of the next appropriate router to send data to the receiving host. A sending host may have to send an ARP request and receive an ARP reply from a receiving host to ascertain an unknown receiving host's address.

Unfortunately, conflicts may arise with the use of certain IP addresses when two hosts are utilizing the same IP address because one host obtained the address through DHCP or other address assignment protocol while the other did not.

Currently, the hosts themselves detect IP address conflict and inform the user of the conflicting host. However the user is not required to take action. This means the conflict can continue to cause problems to the authorized user (the host who obtained the address through DHCP or other address assignment protocol).

Use of a DHCP snooping feature may also solve the problem of multiple hosts utilizing the same IP address on a network. The DHCP snooping feature has a IP-source filtering sub-feature. If enabled, this allows only traffic from specified IP-MAC combinations on a given port, which are obtained by sniffing DHCP packets on the network. If the user enables IP source-filtering, a hardware entry is created for every valid IP-MAC association on a port, based on established DHCP leases. This would cause the traffic from the user with the static assignment to be dropped. However, this can quickly use up hardware resources, depending on the number of hosts on a given port.

Hence, there is a need in the art for a convenient to implement, reliable, inexpensive and efficient method to identify offending hosts whenever an address conflict is detected and selectively drop traffic from those hosts.

SUMMARY OF THE DISCLOSURE

The preferred embodiment of the invention involves a method for identifying hosts using a conflicting static IP address in a network in which a DHCP server has assigned that address to another host and selectively dropping traffic from the offending host.

The principal object of this invention is to provide a method to resolve IP address conflicts in a network with DHCP or other address assignment protocol when some host on the network uses a conflicting static IP address to an IP address properly assigned to a first host.

Another object of this invention is to provide a method that is relatively inexpensive to implement and maintain for resolving IP address conflicts in a network with DHCP or other address assignment protocol if some host on the network uses a conflicting static IP address.

Another object of this invention is to provide a method to resolve IP address conflicts in a network with DHCP or some other address assignment protocol if some host on the network uses a conflicting static address wherein hosts breaking the address assignment protocol policy are quickly isolated, preventing them from causing interruptions for the legitimate host in a resource-efficient manner.

Another object of this invention is to provide a reliable method to resolve IP address conflicts in a network with DHCP or some other address assignment protocol if some host on the network uses a conflicting static IP address.

Yet another object of the invention is permitting efficient usage of hardware resources by obviating the use of IP source filtering for detecting invalid IP-MAC address associations through the provision of a method to resolve IP address conflicts in a network with DHCP or some other address assignment protocol if some host on the network uses a conflicting static IP address.

DETAILED DESCRIPTION OF THE DRAWINGS

The invention involves resolving IP address conflicts in a network with DHCP or some other address assignment protocol when a host on the network uses a conflicting static IP address, which is an IP address that conflicts with an IP address assigned to another host by DHCP or another address assignment protocol.

Figure 1:
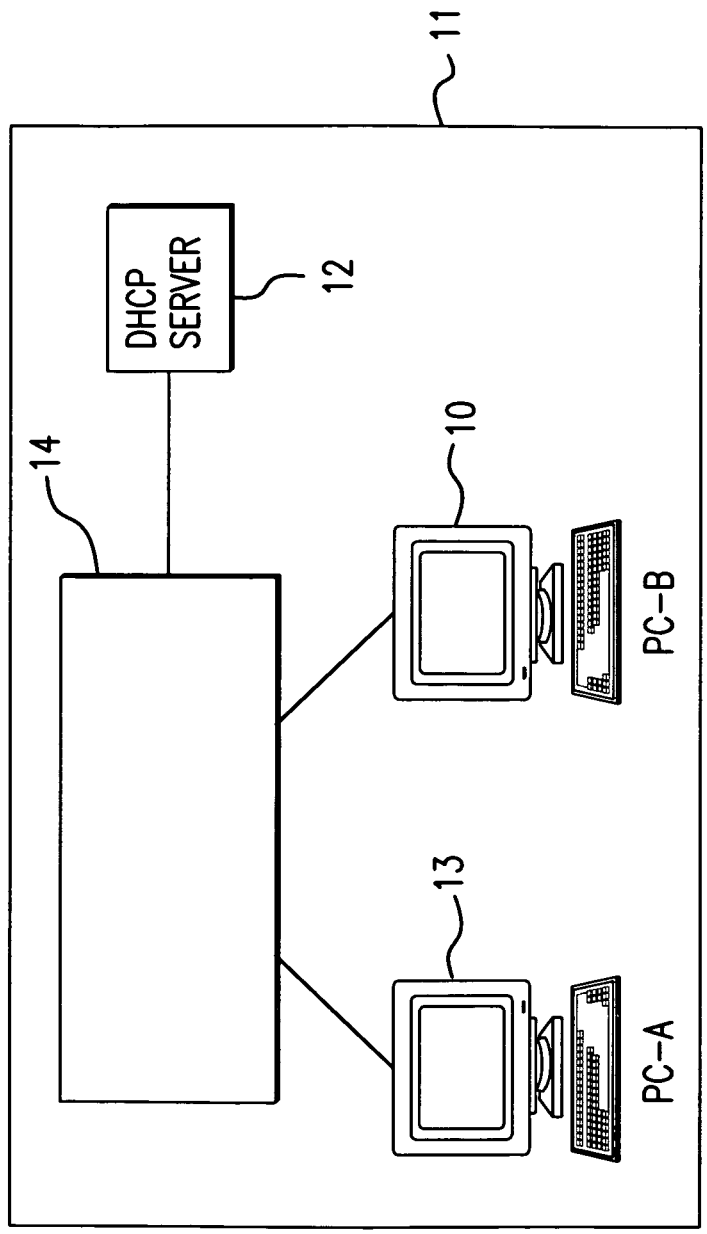
FIG. 1 depicts a VLAN implementing the preferred method of the invention when PC-B (an offending host) is pre-existing on the VLAN before the DHCP server offers its IP address to PC-A.

FIG. 1 depicts a VLAN implementing the preferred method of the invention when PC-B (an offending host) is pre-existing on the VLAN before the DHCP server offers its IP address to PC-A.

The offending host (the one with static mapping), PC-B 10, is pre-existing on a VLAN 11 before the address-assignment server, DHCP server 12, offers its IP address (192.168.1.1) to PC-A 13.

All packets of the address-assignment on the specified VLAN 11 are sniffed. Whenever the DHCP server 12 offers a given IP address to PC-A 13, the router 14 attempts to detect another node/host using the offered IP address, using address resolution protocol like ARP.

The router 14 sends an ARP request for the offered address, 192.168.1.1 in this case. When an ARP Reply is received from PC-B 10, the router 14 assumes the replying host/PC-B 10 to have a static assignment and blocks the MAC address of PC-B 10 on the VLAN 11 for a specific/configurable amount of time and generates a Simple Network Management Protocol (SNMP) trap. That is, when an ARP Reply is received from host PC-B 10, the router 14 treats the replying host PC-B 10 as an offending host having a conflicting static IP address and blocks the MAC address of that host PC-B 10 on the VLAN 11 for a specific and configurable amount of time. During this time, all traffic from PC-B 10 will be dropped by the router 14. Other alternate forms for alerting the administrator can also be utilized.

Figure 2:
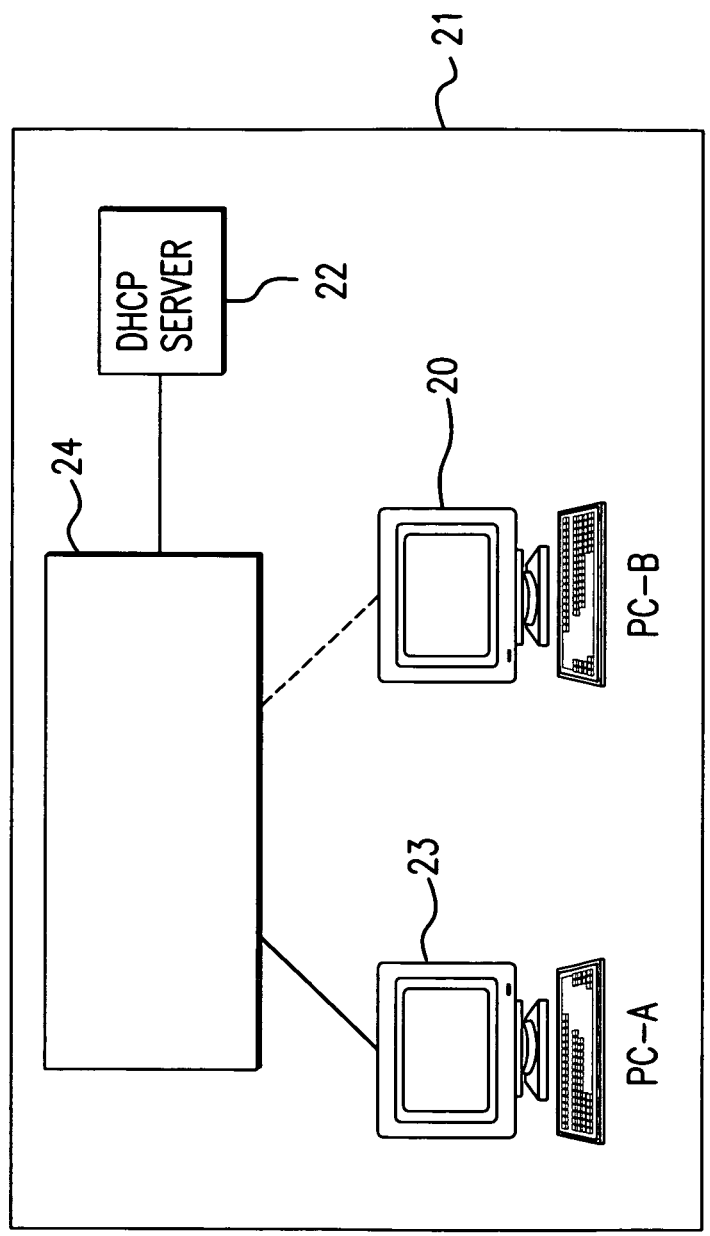
FIG. 2 depicts a VLAN implementing an alternative method of the invention when PC-B (an offending host) joins the VLAN after its address has been assigned by the DHCP server to PC-A.

FIG. 2 depicts a VLAN implementing an alternative method of the invention when PC-B (an offending host) joins the VLAN after its address has been assigned by the DHCP server to PC-A.

The offending host with static mapping, PC-B 20, joins a VLAN 21 after its IP address, 192.168.1.1, has been assigned by the DHCP server 22 to PC-A 23. The router 24 maintains a valid mappings database by sniffing all packets of the address-assignment protocol (e.g. DHCP), based on established leases. The valid mappings database includes a mapping of MAC address and corresponding IP address assigned to a host by the address assignment protocol. The router 24 also sniffs all address-resolution packets on the VLAN on which this feature is configured and checks for conflicts.

The router 24 has a valid mapping of IP address 192.168.1.1 for the MAC-address of PC-A 23. The source information of all address-resolution packets on the VLAN 21 is checked against the database of valid mappings. As part of communicating with any host on VLAN 21, PC-B 20 will either send an ARP Request for the host or reply to an ARP Request from that host. In either case, when the router 24 checks the source information in the ARP packet from PC-B 20 against the database of valid mappings a conflict with the valid mappings database would be indicated, meaning that the authorized user of the IP address 192.168.1.1 is PC-A 23.

Optionally, the router 24 can periodically also send ARP Requests for all hosts in the valid mappings database.

When an offending host is detected via a conflict, i.e. the source information contained in the ARP Reply conflicts with information in the valid mappings database, the MAC-address of the offending host PC-B 20 is blocked on VLAN 21 using a L2 content addressable memory (CAM) for a specific/configurable amount of time. A SNMP trap is also generated to alert the administrator. During this time, all traffic from PC-B 20 will be dropped by the router 24.

An alternate approach would be to allow only address-assignment protocol packets from PC-B. This will permit any immediate corrective action (e.g. switching to DHCP configuration) made on part of the offending host, without needing the administrator's intervention (or the temporary outage). However this would need hardware resource such as a Ternary CAM (TCAM) which would need to be timed out.

It should be understood that the acronym ARP as used herein may refer to any and all address resolution protocol. Similarly, the acronym DHCP as used herein refers to any and all address assignment protocol. For purposes of this application, a router can be any device capable of maintaining a valid mappings database or sending an address resolution protocol request or receiving an address resolution protocol reply.

It is contemplated that the method described herein can be implemented as software, including a computer-readable medium having program instructions executing on a computer, hardware, firmware, or a combination thereof. The method described herein also may be implemented in various combinations on hardware and/or software.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A method to resolve IP address conflicts in a network using address assignment protocol when a host on the network uses a conflicting static address comprising the steps of:

assigning a first host on a VLAN an address assignment from an address assignment protocol server;

sending from the switch an address resolution protocol request for the address assignment to all hosts on the VLAN after address assignment to the first host;

receiving at the switch an address resolution protocol reply from a second host having the address assignment after both the first host and the second host have been assigned the same address assignment; and assuming the second host has a static address assignment; and intentionally blocking traffic coming from the second host on the VLAN by the switch for a specific and configurable amount of time based on the existence of a conflicting IP address between the first host and the second host while still permitting traffic coming from the first host to pass through the switch; and permitting only address-assignment protocol packets from the second host on the VLAN to allow immediate corrective action made on part of the second host.

2. The method of claim 1 further comprising the step of: generating a SNMP trap by the switch.

3. A method to resolve IP address conflicts in a network with address assignment protocol when a host on the network uses a conflicting static address comprising the steps of:

assigning a first host on a VLAN an address assignment from an address assignment protocol server;

maintaining a valid mappings database at a switch;

sniffing at the switch all address resolution protocol packets on the VLAN to detect conflicts after address assignment to the first host;

sending periodically from the switch an address resolution protocol request to all IP addresses in the valid mappings database on the VLAN after address assignment to the first host;

receiving at the switch an address resolution protocol reply from a second host in response to the address resolution protocol request after the second host has previously been assigned the same address assignment as the first host;

checking source information of the address resolution protocol reply against the valid mappings database; and confirming that the second host has the address assignment of the first host;

intentionally blocking traffic coming from the second host on the VLAN at the switch for a specific and configurable amount of time based on the existence of a conflicting IP address between the first host and the second host while still permitting traffic coming from the first host to pass through the switch; and permitting only address-assignment protocol packets from the second host on the VLAN to allow immediate corrective action made on part of the second host.

4. The method of claim 3 wherein a L2 cam is used in blocking the second host with the address assignment.

5. The method of claim 3 further comprising the step of: generating a SNMP trap by the switch to alert an administrator.

6. A method to resolve IP address conflicts in a network with address assignment protocol when a host on the network uses a conflicting static address comprising the steps of:

assigning a first host on a VLAN an address assignment from an address assignment protocol server;

sending from a switch an address resolution protocol request for the address assignment to all hosts on the VLAN after address assignment to the first host;

receiving at the switch an address resolution protocol reply from a second host having the address assignment after both the first host and the second host have been assigned the same address assignment;

assuming the second host has a static address assignment;

intentionally blocking at the switch traffic coming from the second host based on the existence of a conflicting IP address between the first host and the second host on the VLAN for a specific and configurable amount of time while still permitting traffic coming from the first host to pass through the switch;

generating a SNMP trap by the switch; and permitting only address-assignment protocol packets from the second host on the VLAN to permit immediate corrective action made on part of the second host.

* * * * *